United States Patent [19]

Tominaga

[11] 4,258,999
[45] Mar. 31, 1981

[54] POWER SOURCE VOLTAGE CHECKING CIRCUIT

[75] Inventor: Shinji Tominaga, Sakai, Japan

[73] Assignee: Minolta Camera Kabushiki Kaisha, Osaka, Japan

[21] Appl. No.: 86,841

[22] Filed: Oct. 22, 1979

[30] Foreign Application Priority Data

Nov. 20, 1978 [JP] Japan ................... 53-143602

[51] Int. Cl.³ .............. G03B 17/18; G03B 17/38; G08B 21/00
[52] U.S. Cl. .................... 354/268; 324/433; 340/636; 354/60 E; 354/289
[58] Field of Search .......... 354/60 R, 60 E, 60 L, 354/266, 268, 289; 324/429, 433; 320/48; 340/636; 323/15

[56] References Cited
U.S. PATENT DOCUMENTS 3,925,771  12/1975  Satake ................ 354/60 L X
4,126,874  11/1978  Suzuki et al. ............ 354/60 R Primary Examiner—Michael L. Gellner
Attorney, Agent, or Firm—Wolder, Gross & Yavner

[57] ABSTRACT

A voltage checking circuit for checking a power source battery whose terminal voltage changes with time at an early stage subsequent to closing the battery load circuit. The checking circuit correctly checks whether the battery is effective or ineffective even while the terminal voltage is changing. To this end, there is provided a voltage generating circuit which is responsive to the change of the power source battery voltage and generates a constant output when a critical effective battery that shows a critical voltage at its steady state, is in use. The voltage generating circuit generates a voltage other than the constant voltage with a battery other than the critical effective battery. Thus, the power source battery is checked in accordance with the output of the voltage generating circuit.

13 Claims, 6 Drawing Figures

POWER SOURCE VOLTAGE CHECKING CIRCUIT

BACKGROUND OF THE INVENTION

The present invention relates to improvements in circuits for checking the voltage of a power source battery, especially, but not exclusively used in a photographic camera and the like.

DESCRIPTION OF THE PRIOR ART

A voltage checking circuit is heretofore well known, in which the power source voltage under determination is divided by serially connected resistors and one of the divided voltages so derived is applied to the base-emitter of a switching transistor to turn the latter on or off depending on whether the power source voltage is above or below a critical lowermost level adequate or effective for the powered circuit. If such a known voltage checking circuit is employed, for example, in a circuit which disables or interrupts the shutter release of a camera when the power source voltage is lower than a predetermined critical voltage, the following problem is encountered. Generally, the terminal voltage of a battery drops from its no-load level by an amount in accordance with the current drain or supply to a load. In addition, the amount of the voltage drop itself varies as shown herein in FIG. 1 of the drawing, at the early stage subsequent to the initiation of current drain or power supply from the battery. Moreover, the no-load voltage of a battery varies with various factors, such as the degree of battery consumption i.e., how much the battery has been used, ambient temperature, etc. Further, as shown by curves (C) and (D) in FIG. 1, some batteries have different voltage variation characteristics subsequent to the closing of the power switch, even if they have the same no-load terminal voltage.

Now assume that a power source is composed of two serially connected dry batteries, each having a rated voltage of 1.5 V, that a load circuit operates normally while the power source voltage is not lower than a lower limit of 2 V, and that the voltage variation characteristic of the batteries at the initial or early stage with the load circuit being used is similar to that shown in the graph of FIG. 1. With reference to FIG. 1, batteries having the early stage voltage variation versus time characteristics as shown respectively by the curves (A), (B) and (C) provide terminal voltages higher than the lower limit voltage of 2 V, when they reach their steady state after a lapse of a sufficient time subsequent to the closing of the power source switch while the battery having the characteristic shown by (D) provides a terminal voltage lower than 2 V at its steady state condition. In the prior voltage checking circuit, the value of the base bias resistance is determined such that the voltage detecting transistor becomes conductive when the source voltage is higher than 2 V. In such voltage checking circuit, it is at least a time $t_1$ after the closing of the power source switch that the battery having the characteristics (D) of FIG. 1 appears ineffective. It is often the case with cameras, however, that the shutter button is rapidly depressed to release the mechanical parts of the camera shutter, such as in the case of a snapshot. If a camera circuit system is arranged such that the supply of current is initiated in response to a shutter button depression, the circuit is rendered operative before the elapse of time $t_1$, in case the shutter button is too rapidly depressed. In such a case, the circuit is operated at a voltage lower than 2 V which does not ensure normal operation.

In order that the battery having the characteristic D may be checked and established to be ineffective even in the case of the rapid depression of the shutter button, there has been heretofore employed a system which checks the power source voltage in the no-load condition or the voltage upon connection of the power source to the load circuit. However, this system only has a test or reference level higher than the normal critical level so that it may shift out a still effective battery having the characteristic C when the system employs a voltage, for example, $V_2$ in FIG. 1 as the reference level. Thus, the prior art voltage checking systems were deficient in that ineffective batteries were determined effective or on the contrary, effective batteries, ineffective.

SUMMARY OF THE INVENTION

Accordingly, the primary object of the present invention is to provide an improved voltage checking device which correctly determines whether a power source battery is effective or ineffective.

Another object of the present invention is to provide a voltage checking device that is free from the aforementioned defects and disadvantages of the prior art devices.

A further object of the present invention is to provide an improved voltage checking device that correctly determines the adequacy of a battery even at an early or initial stage of the flow of current therefrom to a load which it powers.

Still another object of the present invention is to provide an improved voltage checking circuit for checking the suitability of a power source battery even while its output voltage is changing attendant to a current drain therefrom.

Still a further object of the present invention is to provide an improved battery dynamic voltage checking device in which is employed a reference voltage generating circuit which generates a voltage signal changing with time in substantially the same manner as the voltage of a battery at its minimun suitable or effective condition changes, upon the initial flow of current therefrom to a load. The reference voltage signal is compared with the terminal voltage of a battery feeding current to a load.

One of the features of the present invention resides in that, for use in a circuit system in which the terminal voltage of power source battery changes with time at the initial or early stage of the supply of current therefrom to a load circuit, there is provided a voltage generating circuit which generates a predetermined voltage with the start of the flow of current from the battery to the load circuit for a battery providing the lower limit voltage with which the load circuit can normally operate; and which generates a voltage output higher than the predetermined voltage for a battery showing higher voltage; and a voltage discriminating circuit which has an input coupled to the output of the voltage generating circuit and which inverts its output level when its input signal becomes equal to or higher than the predetermined voltage so that whether a battery is effective or ineffective is determined regardless of the change of the terminal voltage of the battery. Another feature of the present invention lies in that said voltage output circuit comprises a time constant circuit consisting of a resistor and a capacitor in view of the fact that the voltage change of a battery at the beginning of the supply of current exhibits a characteristic similar to that of a time constant curve.

By use of a voltage checking circuit according to the present invention with a camera circuit, a battery voltage can be properly checked even when the camera shutter button is rapidly depressed. Besides, even batteries which were heretofore considered ineffective, although they in fact, are adequate, can be correctly detected to be effective so that such battery can be used for its full life. Also batteries which were heretofore judged effective, though really ineffective, can be correctively detected to be ineffective so that the improper operation of the battery powered circuit can be avoided.

While prior voltage checking circuits treated batteries as ineffective, though they were really effective, or visa versa, with a checking circuit according to the present invention, these defects are eliminated and batteries are used with much greater efficiency.

BRIEF DESCRIPTION OF THE DRAWINGS

The above and other objects and features of the present invention will appear more fully hereinafter from a consideration of the following description taken in connection with the accompanying drawings, in which.

DESCRIPTION OF THE PREFERRED EMBODIMENTS

Figure 2:
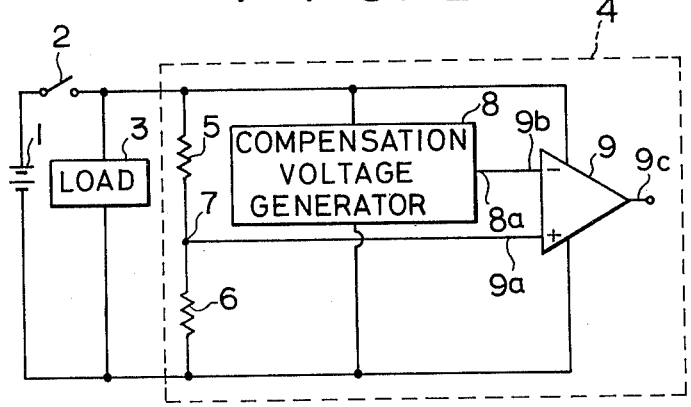
FIG. 2 is a schematic and block circuit diagram of a network demonstrating the principle of the operation of a circuit according to the present invention.

With reference to FIG. 2 of the drawings, a power source battery 1 whose condition is to be checked, comprises, for example, two manganese or alkaline-manganese dry battery cells of the AAA type or L30 type connected in series with each other. A normally open power switch 2 and a load circuit 3 are connected in series across battery 1. In case the circuit of FIG. 2 is associated with a camera, power switch 2 may be disposed to close in response to the camera shutter button depression. In this case, load circuit 3 may include a range detecting circuit for automatic focus control, and/or an exposure control circuit for automatically controlling the exposure time and/or diaphragm aperture. A voltage checking circuit section 4 comprises series connected voltage dividing resistors 5 and 6 connected across load 3, a compensation voltage generating circuit 8 which is shown in detail in FIG. 3 and voltage comparison circuit 9.

Figure 1:
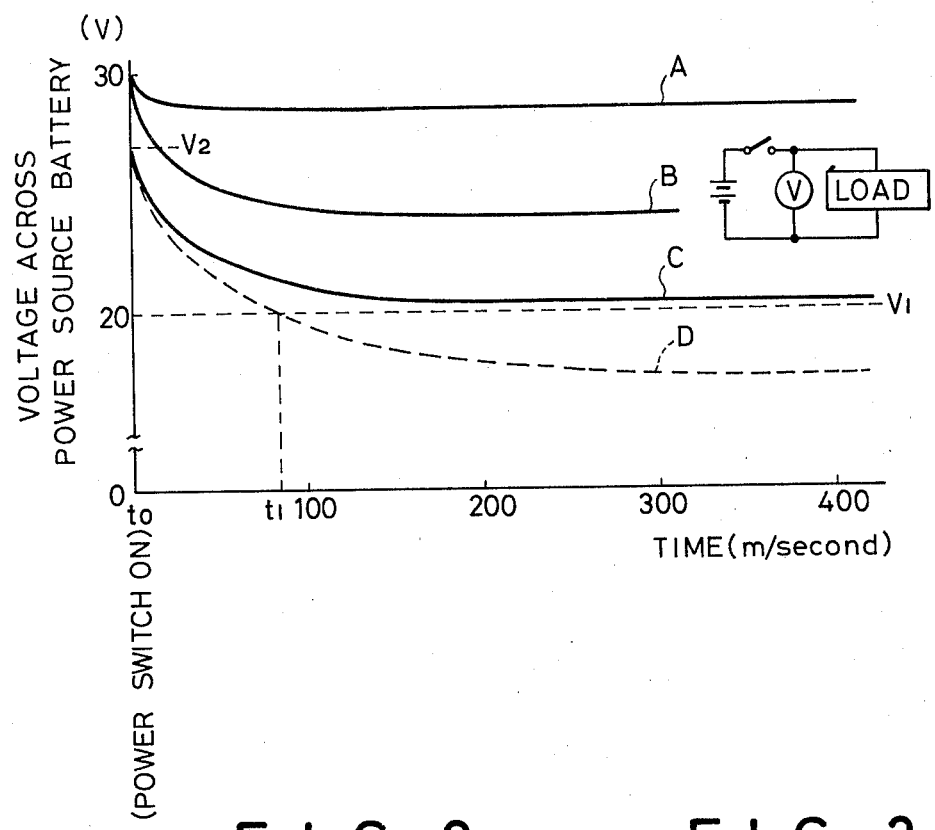
FIG. 1 is a diagram showing the voltage versus time variation characteristics of batteries under initial current drain condition.

The battery having, or in a condition having at the initial or early stage of load current the voltage variation characteristic as shown by the curve C in FIG. 1, i.e., the battery possessing a critical or threshold voltage at its stable or steady state condition will be hereinafter referred to as an effective critical battery. In other words, batteries showing voltages lower than that of the effective critical battery are judged to be ineffective. Assume that compensation voltage generator circuit 8 is constructed to produce a voltage output having a time variation characteristic equal to that of the voltage output produced at the output terminal 7 of the voltage divider circuit, which consists of resistors 5 and 6, when such effective critical battery is in use. In such a case, a constant or predetermined voltage of the value of zero volts appears between terminals 7 and 8 even under the transient condition of the power source voltage at the early stage subsequent to the closure of switch 2. Thus, if voltage comparison circuit 9 is arranged to produce an output of certain state or value when the level at input terminal 9a equals to or exceeds that at input terminal 9b, and produces an output of another state or value when the level at 9a falls below the level at 9b, the voltage of the power source battery will be checked as is contemplated by the present invention.

Figure 3:
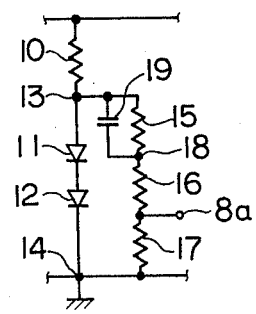
FIG. 3 is a detailed circuit diagram of the compensation voltage generator of the network illustrated in FIG. 2.

Referring now to FIG. 3, series connected resistor 10 and diodes 11 and 12 form a constant voltage circuit which produces a constant voltage between terminals 13 and 14. Between terminals 13 and 14 are series connected, three resistors 15, 16 and 17, with a capacitor 19 connected in parallel with the resistor 15. The junction between resistors 16 and 17 corresponds to output terminal 8a of the circuit 8 of FIG. 2. Now assume that Vc is the constant voltage produced between terminals 13 and 14. At output terminal 8a, a first voltage equal to $Vc \cdot R_{17}/R_{16}+R_{17}$, the voltage obtained by the division of constant voltage Vc by the resistance of resistors 16 and 17 and multiplied by resistor 17, appears initially when power switch 2 is closed, and a second voltage equal to $Vc \cdot R_{17}/R_{15}+R_{16}+R_{17}$, the voltage obtained by the division of voltage Vc by series connected resistors 15 and 16 and resistor 17 and multiplied by resistor 17 appears after a lapse of a sufficient time. The voltage variation versus time characteristic of the output from output terminal 8a while the output changes from the first voltage to the second is determined by the resistance value of resistor 15 and the capacity of capacitor 19 which constitutes an RC circuit. The aforesaid first voltage and second voltage are set to be equal to those which appear at output terminal 7 in the circuit of FIG. 2, respectively when switch 2 is closed and when the sufficient time has elapsed, in the case when the effective critical battery is in use as the power source 1. Also, by properly selecting the capacity of capacitor 19 as related to the value of resistor 15, the voltage variation characteristic of the output from the output terminal 8a is approximately that of the output from output terminal 7.

The above described circuit is arranged to supply an input voltage, which does not change with time, to voltage comparison circuit 9 in the case of an effective critical battery being used, by producing in voltage signal producing circuit 8 the same voltage as that appearing at output terminal 7 as a fraction of the power source voltage.

Figure 4:
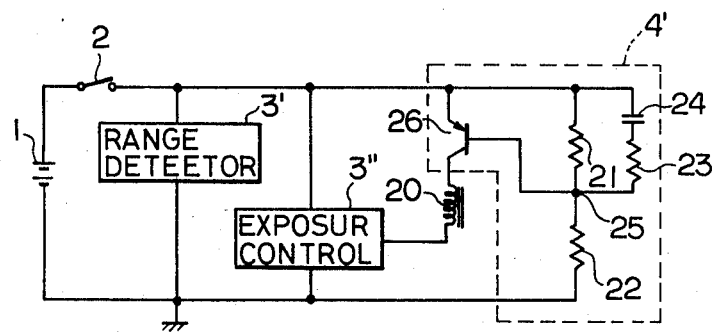
FIG. 4 is a schematic circuit diagram showing an embodiment of the present invention.

Referring now to FIG. 4 which is a circuit diagram of another embodiment of the present invention as applied to a camera in which the shutter release is prevented when the battery is judged to be ineffective by the voltage checking circuit, a well known automatic range finder circuit 3' for automatic focusing and a well known exposure time control circuit 3" comprising a photo-conductive element receiving light from an object to be photographed, a capacitor for integrating the photocurrent through the photoconductive element, a Schmidt circuit responsive to the terminal voltage of the capacitor, ect., are connected in parallel through a normally open power switch 2 across battery 1. An electromagnet 20 is deenergized by the inversion of the output of exposure-time control circuit 3″ to initiate the shutter closure. Electromagnet 20 is also used as a component of a locking mechanism which locks and prevents the further depression of the camera shutter button to prohibit shutter release when upon closure of power switch 2, the energizing current is not supplied to the electromagnet because transistor 26 through whose output the electromagnet is connected to the current remains non-conducting. To this end, the construction, for example, disclosed in Japanese Laid Open Utility Model Publication No. 49-14423 may be employed.

The voltage checking circuit 4′ according to the present invention employs a transistor 26 as the voltage judging circuit corresponding to that of the embodiment of FIG. 2. The circuit, comprising series connected resistors 21 and 22 and series connected resistor 23 and capacitor 24 connected across resistor 21 and coupled with the base of transistor 26, is a voltage generating circuit for generating a constant or predetermined voltage output between the end terminals of resistor 21 from the beginning of the flow of current from the battery power supply when the switch 2 is closed and an effective threshold battery is in use.

The operation of the circuit of FIG. 4 will now be described. Considering the voltage across resistor 21 when power switch 2 is closed and current is supplied from battery 1, upon the closure of switch 2, capacitor 24 is in an uncharged condition so that across resistor 21 there appears a fraction of the terminal voltage of the battery 1, which fraction is the ratio of the effective combined resistance of parallel connected resistors 21 and 23 to the sum of the resistance values of resistor 22 and such combined resistance. Then, after a lapse of a sufficient time, the effect of the series circuit of resistor 23 and capacitor 24 disappears and the battery voltage multiplied by the resistance of resistor 21 divided by the sum of the resistance values of resistors 21 and 22 will appear across resistor 21. Assuming that $V_{E1}$ is the voltage of power source battery, immediately upon closure of switch 2, $V_{E2}$ is the power source battery voltage after the lapse of a sufficient time and that $V_{B1}$ and $V_{B2}$ are the voltages across resistor 21 when the power source voltage is $V_{E1}$ and $V_{E2}$ respectively, then the following equations are obtained:

$$V_{B1} = \frac{(R_{21}//R_{23})}{R_{22} + (R_{21}//R_{23})} \cdot V_{E1} \quad (1)$$

$$V_{B2} = \frac{R_{21}}{R_{21} + R_{22}} \cdot V_{E2} \quad (2)$$

wherein $R_{21}//R_{23}$ represents the combined resistance value of resistors 21 and 23 connected in parallel.

Figure 5:
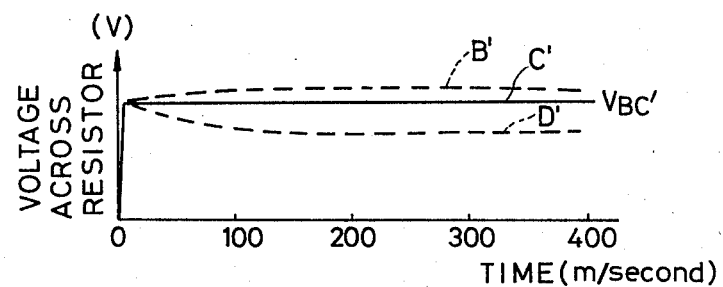
FIG. 5 is a diagram showing the time varying characteristics of the voltage across resistor 21 of the circuit of FIG. 4.

In the equations 1 and 2, if $V_{E1}=V_{E2}$, i.e. the battery voltage does not change, we will have $V_{B1}<V_{B2}$. However, the fact is that $V_{E1}>V_{E2}$ as mentioned above. Accordingly, the circuit can be arranged such that $V_{B1}=V_{B2}$ for specific voltages $V_{E1}$ and $V_{E2}$, by selecting proper values for resistors 21, 22 and 23. In addition, by properly selecting the capacity of capacitor 24, the terminal voltage of resistor 21 can be maintained substantially constant for the effective critical battery even in the period of transition of the battery voltage from $V_{E1}$ to $V_{E2}$. If the terminal voltage of resistor 21 in this case is represented by $V_{BC}$, terminal voltages of resistor 21 for the batteries showing the characteristics B and D in the graph of FIG. 1 that are higher or lower than that of the effective critical battery, will change as represented by the curve B′ or D′ in the graph of FIG. 5. It should be understood that the scale of the ordinate in this graph represents the potential relative to that at connection in the circuit of FIG. 4. Thus, the voltages as shown in the graph of FIG. 5 are each respectively applied to the input of the base-emitter of transistor 26. Therefore, the value of constant voltage $V_{BC}$ may be set such that transistor 26 rendered conductive when the voltage appled to its base is equal to or higher than the constant voltage $V_{BC}$ represented by the line C′ and generated when the effective critical battery is in use. When a power source battery bearing the voltage variation characteristics in which the voltage is below the constant voltage $V_{BC}$ such battery is judged to be ineffective since transistor 26 becomes immediately non-conducting even if it becomes instantaneously conductive right after power switch 2 is thrown. Thus, the shutter release is blocked.

Figure 6:
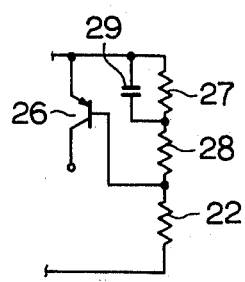
FIG. 6 is a circuit diagram corresponding to that in block 4' of FIG. 4 in accordance with another embodiment of the present invention.

The circuit including resistors 21 and 23 and capacitor 24 in network 4′ of FIG. 4 can be substituted by the circuit of FIG. 6 including resistors 27 and 28 and capacitor 29. In the latter circuit resistors 22, 27 and 28 are series connected, capacitor 29 shunts resistor 27 and series connected resistors 27 and 28 are connected between the base and emitter of transistor 26. Although the embodiment of FIG. 4 operates to lock the shutter release mechanically by electromagnet 20, an electromagnetic release mechanism may be employed for the camera such that the electromagnetic release action can be controlled by the transistor 26 to disable the release operation for an ineffective battery.

The above-described circuits according to the present invention need not be applied to a camera containing an electronic flash device and having a power supply circuit for said flash device with a power source which is common with that for an automatic range finding circuit and an exposure control circuit, if the power switch is to be thrown to the flash circuit before the shutter is released. In this case, a sufficient time elapses after the throwing of the power switch when the shutter is released. In such a case, a switch is advantageously provided which is interlocked with the power source switch to remove the capacitor 24 or 29 from the circuit when the power switch is thrown to the photoflash circuit.

Although the present invention has been explained mainly in relation to the case where the battery checking device according to the invention is associated with a camera control circuit, it should be understood that the application of the device of the present invention is not limited to that field but, that such device is applicable to any kind of electric circuit which includes a power source battery that should be checked even while its terminal voltage is changing.

It is further understood that the forms of the present invention herein shown and described are given only as preferred examples of the same and that various changes and modifications may be resorted to without departing from the spirit of the invention or the scope of the appended claims.

I claim:

1. A voltage checking circuit for a power source battery which supplies current to a load circuit and whose terminal voltage changes with time subsequent to the initiation of current drain from the battery, said voltage checking circuit comprising:
   a voltage generating means connected to said power source battery for generating a predetermined voltage in response to the change of the terminal voltage of said power source battery when said power source battery is at a critical condition showing a critical effective level while it supplies power to said load at its steady state, said voltage generating means generating a higher or lower level signal for the power source battery not at the critical condition; and
   a voltage discriminating means for detecting the voltage generated by said voltage generating means and for generating an output in accordance with the voltage.

2. A voltage checking circuit as in claim 1, wherein said voltage generating means includes a voltage divider which in turn includes a first resistor and a capacitor coupled with said resistor so that the output of said voltage divider changes depending on the charging condition of said capacitor.

3. A voltage checking circuit as in claim 2 wherein said voltage divider further includes series connected second and third resistors coupled with said first resistor and capacitor to form a variable voltage divider.

4. A voltage checking circuit as in claim 3 wherein said variable voltage divider is connected across said power source battery and said voltage descriminating means includes a switching element responsive to the output of said variable voltage divider.

5. A voltage checking circuit as in claim 3 further comprising a constant voltage generator for generating a constant voltage regardless of the power source battery voltage, and wherein said voltage generating means includes a second voltage divider connected across said power source battery, and a comparator for generating an output in accordance with the difference of the outputs of said variable and second voltage dividers.

6. A voltage checking circuit for a power source battery which supplies current to a load circuit and whose terminal voltage changes with time subsequent to the initiation of the flow of current from said battery to said load circuit, said voltage checking circuit comprising:
   a voltage divider connected across said power source battery for generating a first voltage signal as a fraction of the power source voltage;
   a voltage generator for generating a second voltage signal whose voltage changes substantially in the same variation characteristics as that of a power source battery at the critical effective condition thereof; and
   a comparator for comparing said first and second voltage signals.

7. A device for determining the condition of a battery having a critical minimum time varying voltage characteristic during the initial interval following the supply of current therefrom to a load comprising: reference signal circuit means for producing a time varying reference voltage during said initial interval;
   comparator circuit means responsive to said reference voltage and said battery voltage during said initial interval for producing at its output a predetermined voltage when the time varying voltage of said battery during said initial interval corresponds to said minimum voltage characteristic and to produce an output voltage differing from said predetermined voltage when said battery voltage is less than said minimum voltage characteristic; and
   means responsive to said comparator circuit output.

8. The device of claim 7 wherein said comparator circuit means includes a voltage divider means for producing a sample voltage which is a fraction of said battery voltage during said initial interval, said comparator circuit means being responsive to said sample voltage as representative of said battery voltage.

9. The device of claim 8 wherein said reference signal circuit means comprises an RC network and means connecting RC network to said battery during said initial interval.

10. The device of claim 8 wherein said voltage divider means includes a plurality of resistors connected in series across said battery during said initial interval and said reference signal circuit means comprises a capacitor and resistor connected in series across one of said voltage divider resistors.

11. The device of claim 8 wherein said voltage divider means comprises first, second and third resistors series connected across said battery during said initial interval and said reference signal circuit means includes a capacitor connected across one of said first and second resistors and said comparator circuit means output being defined by the junction of said second and third resistors.

12. The device of claim 11 including a fourth resistor connected in series with said first, second and third resistors and a constant voltage diode connected across said first, second and third resistors.

13. The device of claim 7 for use in a camera including an operation circuit means including a switch connecting said operation circuit across said battery and a shutter release button closing said switch at the initial depression of said button and wherein said reference signal and comparator circuit means are connected through said switch across said battery and said comparator circuit output responsive means includes means responsive to said output for preventing the full depression of said shutter release button when said battery time varying voltage during said initial interval is less than said reference voltage.

* * * * *